United States Patent [19]
Thomason et al.

[11] Patent Number: 6,006,262
[45] Date of Patent: Dec. 21, 1999

[54] METHOD AND SYSTEM FOR PRESENTING A MULTIMEDIA TITLE THAT IS BASED ON A MULTI-NODE STRUCTURE WHILE PREFERRING NODES WITH A RELATIVELY SPARE VISIT HISTORY OVER NODES THAT HAVE A RELATIVELY FREQUENT VISIT HISTORY

[75] Inventors: Graham G. Thomason, Redhill, United Kingdom; Joanne H. D. M. Westerink, Eindhoven, Netherlands; Gijsberta M. M. Majoor, Eindhoven, Netherlands; Maria d. l. M. Docampo Rama, Eindhoven, Netherlands

[73] Assignee: U.S. Philips Corporation, New York, N.Y.

[21] Appl. No.: 09/036,014
[22] Filed: Mar. 3, 1998

[30] Foreign Application Priority Data

Mar. 5, 1997 [EP] European Pat. Off. .............. 97301495

[51] Int. Cl.$^6$ .................................................... G06F 13/00
[52] U.S. Cl. ........................................... 709/224; 709/229
[58] Field of Search .................................. 709/224, 229, 709/219, 240, 217; 345/334, 345

[56] References Cited

U.S. PATENT DOCUMENTS 5,559,984   9/1996  Nakano et al. ........................... 395/448
5,727,129   3/1998  Barrett et al. ............................. 395/12
5,893,922   4/1999  Baylor et al. ............................ 711/148

FOREIGN PATENT DOCUMENTS

0551696A1  7/1993  European Pat. Off. ....... F06F 15/419
0777187AA2 6/1997  European Pat. Off. ........ G06F 17/30

Primary Examiner—Zarni Maung
Attorney, Agent, or Firm—Anne E. Barschall

[57] ABSTRACT

A method and system for presenting a multimedia title that is based on a multi-node structure while preferring nodes with a relatively spare visit history over nodes that have a relatively frequent visit history.

For a multimedia title that is based on an information structure with a finite number of information nodes, first an entry point to the structure is presented to a user. Further, user visits as pertaining to specific nodes are logged, and a visit history of certain nodes is indicated to a user. In particular, the indicating prefers to present nodes with a relatively spare visit history over nodes that have a relatively frequent visit history.

9 Claims, 3 Drawing Sheets

METHOD AND SYSTEM FOR PRESENTING A MULTIMEDIA TITLE THAT IS BASED ON A MULTI-NODE STRUCTURE WHILE PREFERRING NODES WITH A RELATIVELY SPARE VISIT HISTORY OVER NODES THAT HAVE A RELATIVELY FREQUENT VISIT HISTORY

BACKGROUND OF THE INVENTION

The invention relates to a method for presenting to a user a multimedia title that is based on an information structure comprising a finite number of information nodes, said method comprising the steps of:

presenting an entry point to said information structure, logging user visits as pertaining to specific said nodes, and indicating to a user a visit history of one or more particular nodes.

EP 551 696 A1 describes a hypertext display system wherein within an actual presentation window, various linking items have their actual visit history indicated. This history would allow the actual user to choose whether past preferences should be followed again, or rather avoided. The reference indicates the visit history of the various nodes in an indiscriminate manner and in particular restricts its presenting to exclusively on the actual display level. The present inventors have experienced that often the information structure of a multimedia title is so complex that user persons tend to loose track and overlook the visiting of particular unvisited, yet interesting nodes. The complexity is caused by the often great number of nodes, as well as by the various different characters of respective nodes.

SUMMARY TO THE INVENTION

In consequence, amongst other things, it is an object of the present invention to allow the system to guide users to nodes that they would potentially be interested in but have as yet not visited sufficiently, without actually blocking a free access to the information structure as a whole. Now therefore, according to one of its aspects, the invention is characterized in that said indicating presents one or more nodes with a relatively spare visit history in preference over nodes that have a relatively frequent visit history. In this way, the user can distinguish which nodes have been relatively little visited, and would therefore merit a try.

Advantageously, said spare visit history implies zero visits made within a reference time domain. It has been found that often a single visit to each node is considered sufficient for experiencing the title in question, and in this manner, exclusively unvisited nodes are proposed. The reference time domain may of course be infinitely long, or rather much shorter, such as one week or one day.

Advantageously, said spare visit history pertains to a single user person and/or a single user session. If the user is identified through some identifier, or the session through some login/logout procedure, the system may discriminate between various users.

Advantageously, said indicating favours the presenting of nodes that are closer to said entry point and/or nodes that are logically more distant from an actual node over other nodes. Often, the nodes are arranged in a hierarchical network, and presentation starts at the highest level. Unvisited nodes at a higher level in the network then often have a higher relevance to a user than those on a lower level. Also, nodes that are more distant from an actual node in terms of logical distance in a network are judged more relevant. The rationale of the latter is that users often tend stay within a subset of the nodes that are mutually close. Presenting a far-off node will offer to the user a new view on the title in question.

Advantageously, said presenting is subordinated to a randomizing operation. If an appreciable number of nodes have an identical visit history, in particular zero visits, the randomizing thereamongst will avoid the presenting of again only a subset of all unvisited nodes, such as those with the lowest node number, or only those that come first in an alphabet.

Advantageously, the invention uses an automatic guide mode to arrive at a presented node. The automatic guide will take a user, either from the entry point, or from another point that is considered most instructive, to the eventually presented node, along various intermediate nodes. In this manner, the user will retain some global idea of the position of the newly presented node within the overall information structure.

The invention also relates to a system arranged for implementing a method as recited hereabove. Further advantageous aspects of the invention are recited in dependent Claims.

BRIEF DESCRIPTION OF THE DRAWING

These and further aspects and advantages of the invention will be discussed more in detail with reference to the disclosure of preferred embodiments hereinafter, and in particular with reference to the appended Figures that show.

DETAILED DESCRIPTION OF PREFERRED EMBODIMENTS

Figure 1:
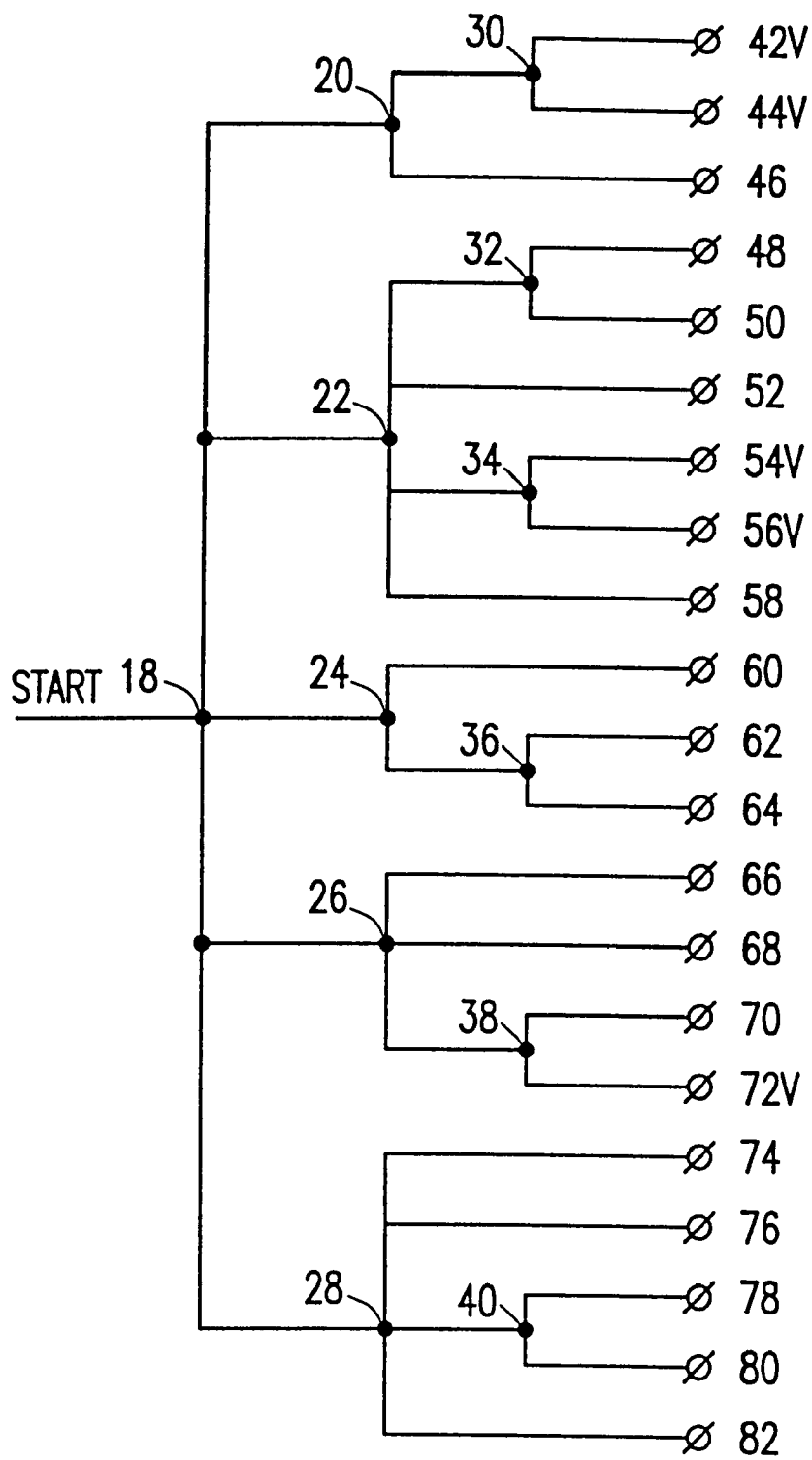
FIG. 1, an exemplary structure of a multimedia title.

FIG. 1 is an exemplary structure of a multimedia title. A title generally is a consistent structure of information items, that may be visited or executed. Visiting means that a user notices the existence of an item, such as through viewing its opening screen. Executing means that the user has "done" something with the item in question, such as traversing, selecting a particular part thereof, or undertaking an interaction. In the diagram, each dot represents such multimedia item, that may for example be a single picture, an animation, a movie clip, an audio interval, or a combination of the above. Furthermore, the title may be interactive on various different levels. A first level is that the items may be chosen for presentation. A second one is that certain items may want user input to proceed, such as the answering of questions. A third level of interactivity needs continuous interaction, such as a game interval. All the above types may figure as nodes in a title.

Upon activating the application or title, a start frame or other entry point is displayed, cf. the disclosure with respect to FIG. 3 hereinafter. Now, as shown, the title is structured according to a hierarchical tree with nodes, that herein all represent an individual multimedia item that is feasible for visit or execution. Note that the depth need not to be uniform across the network. In another setup, certain nodes on levels above the lowest level do not have their own item, but only operate as a selection mechanism. The structure need not be a tree, but may allow a node to be interconnected to more than one parent node. Furthermore, in principle the existence of loops would be feasible. The interconnection pattern might be unsteady in time. Various other variations in the structure could occur. Now, as shown, among the nodes 18 to 82, certain ones have common ancestors on a low level, such as nodes 54 and 56. Others have common ancestors on a much higher level, such as nodes 72 and 74. Such pedigree may involve one or more intermediate nodes, such as 26, 28 and 38 in the latter case.

This number of intermediate nodes gives the logical distance between two nodes.

Figure 2:
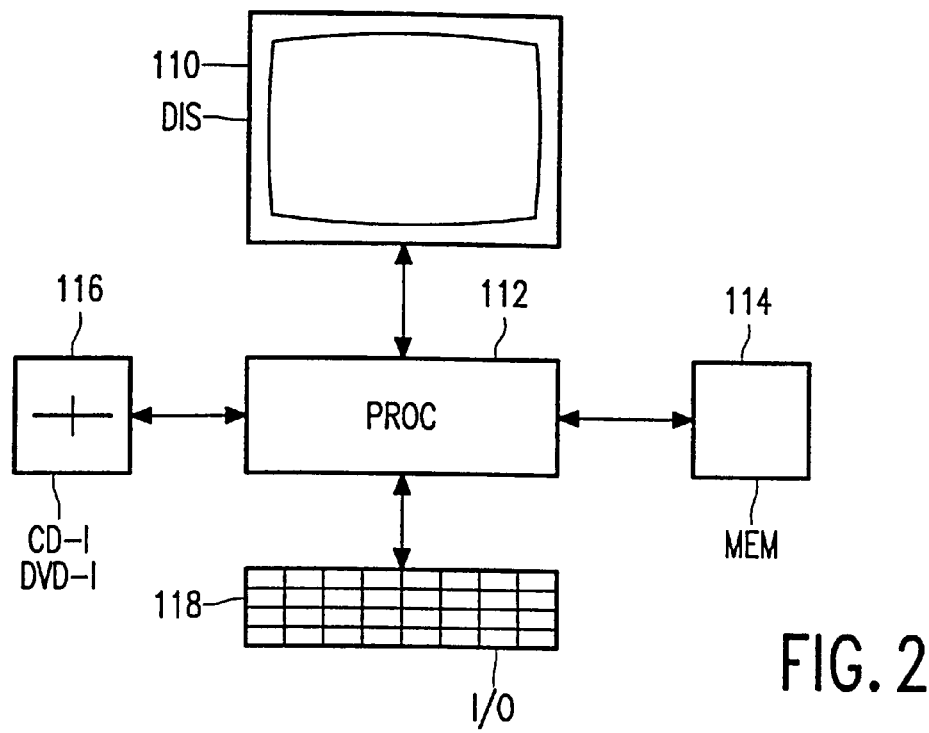
FIG. 2, an information processing system block diagram.

FIG. 2 is a block diagram of an information processing system. The source of the title is a disc player 116 that may load a CD-I disc, a CD-ROM, a DVD-I disc, or another appropriate storage medium. Alternatively, the load mechanism may be from an external source, such as Internet. The principle of the invention however requires that the total number of distinctive items of an application is finite at any instant, although across time, the number may in principle vary. This may be caused by the varying accessibility of a particular node over time, or even the loading of a new node from an external source. Element 112 represents the central processing facility that implements the supporting program. Element 110 is a more or less standard video display facility. Element 114 represents local memory facility. Element 118 represents the I/O facilities. As indicated, it contains keyboard functionality, but other channels, such as mouse and speech may be present beside or in place of the keyboard. The multimedia title may alternatively be loaded from a network facility that has not been indicated for brevity. One of the elements of the processing is for each applicable node the logging of the number of visits to that node. As long as the visit history of a particular node is low, it is assumed to be of potential interest to a user or to a particular user session. In a comprehensive organization, the logging may keep track of all visits to a particular node, together with an identifier of the actual user, the actual time instant, and other qualifiers such as the nature of the visit. In an elementary organization, the logging results in just a single boolean.

Figure 3:
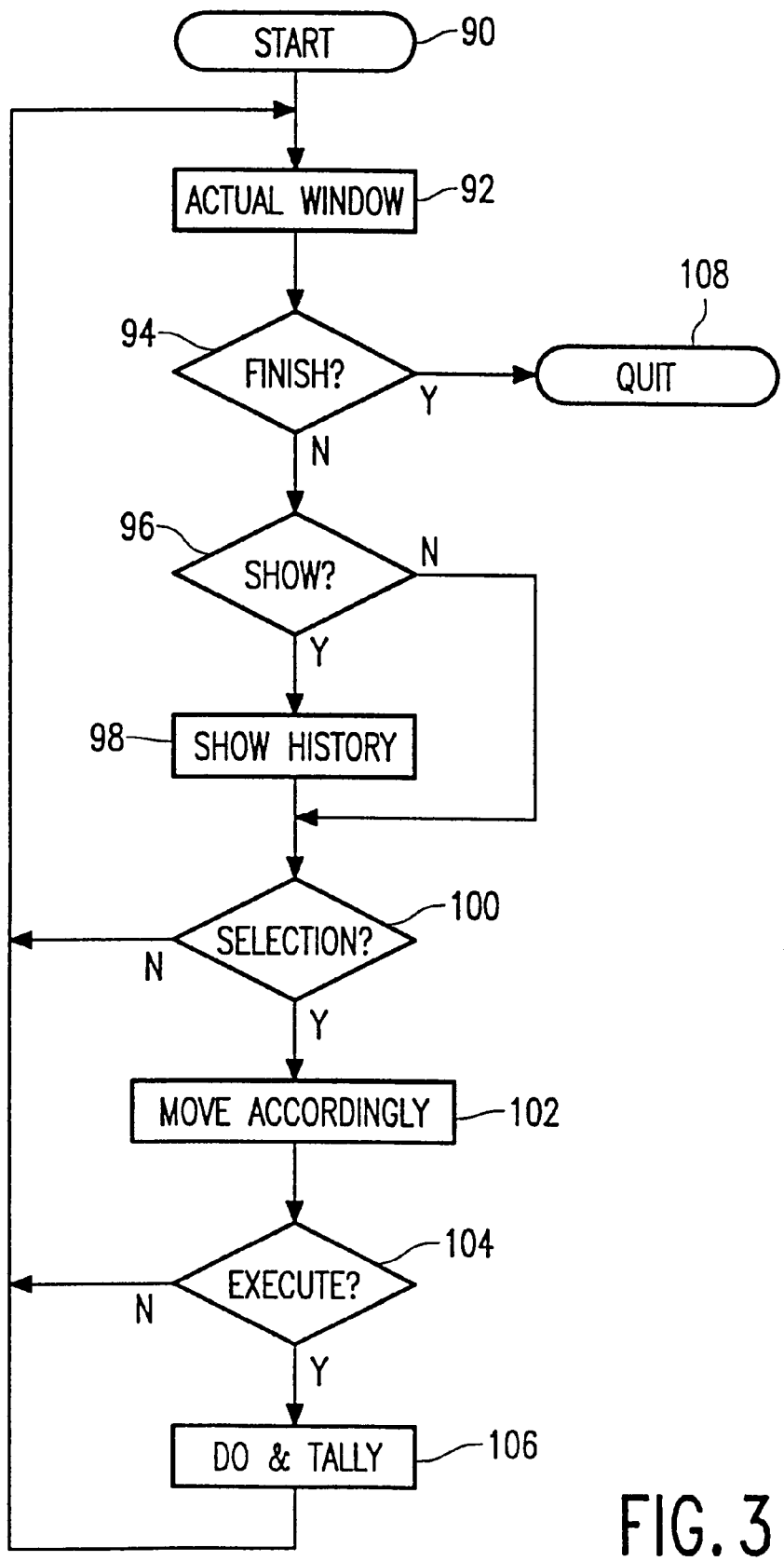
FIG. 3, a flow chart according to the invention.

FIG. 3 is a flow chart of an exemplary procedure according to the invention. In block 90, the application is downloaded and started, which may need assigning an appropriate amount of the various facilities shown in FIG. 2. The starting proper leads to the display of a start window, which is symbolized in block 92. This starting window, or in any case a window that automatically ensues through the start, which may correspond to node 18 in FIG. 1, should offer some user interactivity, such as through hotspotting or any other appropriate user responsivity. A first possibility is that the user decides to finish the title, which is detected in block 94 and then leads to quitting in block 108. This thereupon relinquishes the machine facilities to other purposes. Alternatively, the user may ask in a dialogue structure to show the history of the various nodes. This request is detected in block 96, whereupon the system presents to the user one or more nodes that have a relatively spare visit history in preference over other nodes that have a relatively frequent history. The selection may be randomized among all nodes that had not been visited at all. The presenting may be in the form of a name of the node in question, or of some display screen, audio tune, or the like that is associated to that node. Alternatively, the presenting immediately implies a visit to a single selected node, which thereupon may be executed as well.

Next to the newly presented nodes, items that were selectable earlier may remain so, but may alternatively be superseded by the presented nodes. Subsequently, in block 100, the system detects whether the user person makes indeed any particular selection, and if positive, in block 102 presents the selected node. If no selection is signalled by the user within a certain time interval, the system goes back to block 92, for displaying an actual window. This may pertain to the most recent window without the preferential presentation of rarely visited items, or some other window, according to the strategy of the title. Note that the selecting may be effected in a hierarchical manner, so that "non-execute" in block 104 may be an implicit user request for the next lower level of choice. The latter two possibilities have not been shown separately. If the request for executing is made explicit, in block 106 the item is executed indeed and the visit log is incremented by 1. After finishing the node, the system goes again to block 92 for an appropriate window display. Various ones of the above blocks may be effected in different ways that by themselves do not deviate from the invention, in that they are in fact outside the crux of the invention proper, that pertains to the preferential presenting of nodes with a relatively spare visit history.

Figure 4:
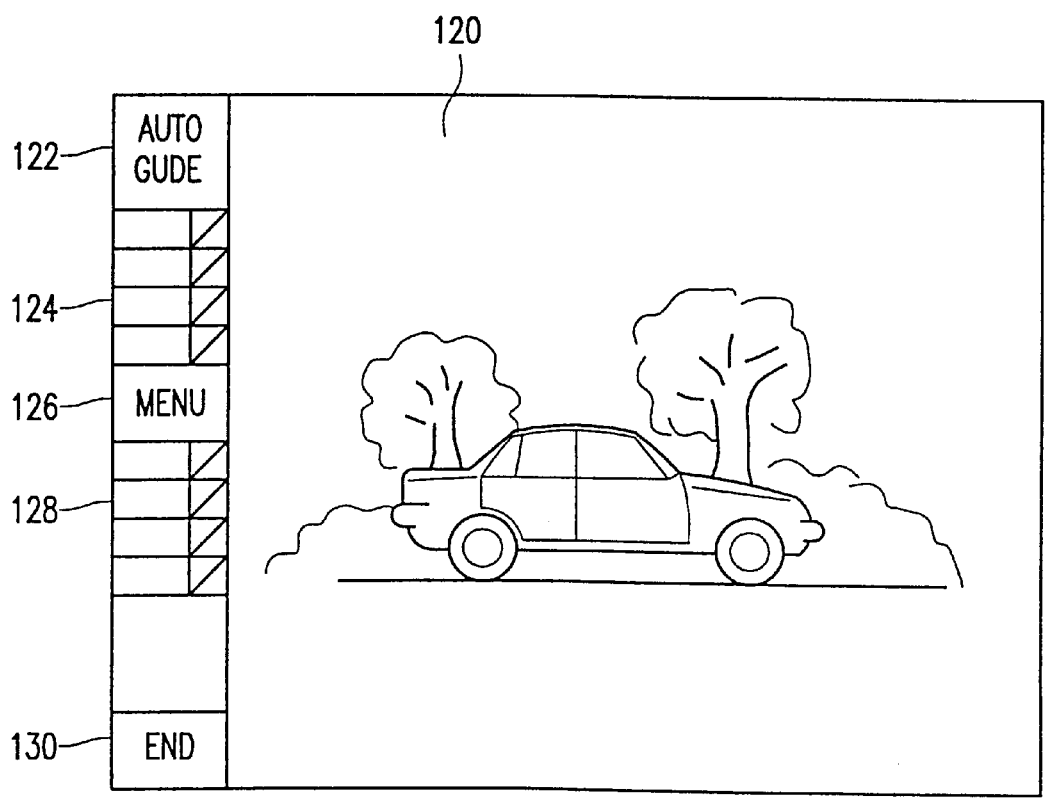
FIG. 4, an exemplary presentation configuration.

FIG. 4 shows an exemplary presentation window configuration, that features during blocks 94, 96, 98 in FIG. 3. The main part of the display 120 may be devoted to some screen representation of the situation the title is presently in. The user interactivity is realized here through a column of software buttons at left. Initially, only buttons 122, 126, and 130 are active. First key 130 corresponds to the quitting selection in block 94 in FIG. 3. Second, key 126, called MENU, activates the showing of array 128. Array 128 contains four buttons in the form of a menu, each button representing a node that immediately derives from the actual node the system is presently in. Given the actual node identity, the relation to the selection 128 among all possible items of the information structure is fully causal. As is clear from FIG. 1, the number of nodes so accessible varies as depending only on the actual node.

Third, key 122, not represented in FIG. 3, is labelled AUTO, and is used for calling the guidance mechanism according to the invention. If actuated, any subsequent selection of a node that is presented by the system as having a relatively spare visit history is arrived at through an automatic guide procedure. For example, if the system is presently in node 72 in FIG. 1, and the next node to visit is node 78, the following nodes may be briefly shown in sequence: 38, 26, 18, 28, 40 and 78. This allows a user to maintain an idea of the intermediate network structure to arrive at node 78. In a simplified setup, the travel is only made from the starting point of the structure, or alternatively from the highest common ancestor among the origin node and the destination node. In case the structure allows more than one path, the choice thereamong may be made in an arbitrary manner.

On the other hand, array 128 of buttons may be actuated in similar manner as array 124, thereby allowing a user not to follow the suggestion by the system for nodes with a relatively spare visit history. The strategy for deciding which nodes should be displayed has been discussed with reference to FIG. 1. In a first arrangement, only the lowest level of nodes is considered relevant for presenting, in that higher level nodes are used only for effecting a further choice. Now, as shown in FIG. 1 by a V, nodes 42, 44, 54, 56, and 72 have been visited once, the others never. A first strategy is to present only nodes that have never yet been visited and furthermore, are logically as far as possible from the ones already visited. For example, the logical distance between nodes 70 and 72 is 1. The logical distance between nodes 66 and 68 is 2. This strategy would first suggest nodes 60–64 and 74–82. Inasmuch as only four nodes may be shown, a random selection may made from these eight nodes 60–64 and 74–82. Alternatively, wholly or partially instead of these nodes, the selection may include nodes that are split off only at the second highest level from branches that contain a node already visited, such as 46, 48, 50, 52, 58, 66, 68. The randomizing may then be effected with an appropriate weighting factor.

In case more than the lowest level alone contains executable nodes, the strategy may prefer higher level nodes that have not yet been visited or executed, over lower level nodes. In the situation shown in FIG. 1, this would give advantage to nodes 24 and 28. Furthermore, the number of earlier visits may contribute, such as that two or more visits will disqualify a node completely, whereas a single visit will only halve the probability factor for presentation. The logging of a particular title may prevail through only a single session, or during a particular time interval, such as one week. It may also be limited to a single person, such as through registering the person by a name or password during login. It should however be clear, that the choosing among the nodes to present them to a user is exclusively determined by the configuration of the information structure, and not by the contents or operations of the various nodes.

We claim:

1. A method for presenting to a user a multimedia title that is based on an information structure comprising a finite number of information nodes, said method comprising the steps of:

presenting an entry point to said information structure, logging user visits as pertaining to specific said nodes, and indicating to a user a visit history of one or more particular nodes, characterized in that said indicating presents one or more nodes with a relatively spare visit history in preference over nodes that have a relatively frequent visit history.

2. A method as claimed in claim 1, wherein said spare visit history means zero visits made within a reference time domain.

3. A method as claimed in claim 1, wherein said spare visit history pertains to a single user person and/or a single user session.

4. A method as claimed in claim 1, wherein said indicating favours the presenting of nodes that are closer to said entry point and/or nodes that are logically more distant from an actual node over other nodes.

5. A method as claimed in claim 1, wherein said presenting is subordinated to a randomizing operation.

6. A method as claimed in claim 1, furthermore using an automatic guide mode to arrive at a presented node.

7. A system arranged for presenting to a user a multimedia title that is based on an information structure comprising a finite number of information nodes, said system comprising:

presentation means for presenting an entry point to said information structure, logging means for logging user visits as pertaining to specific said nodes, and indicating means for indicating to a user a visit history of one or more particular nodes, characterized in that said indicating means have ranking means for presenting one or more nodes with a relatively spare visit history in preference over nodes that have a relatively frequent visit history.

8. A system as claimed in claim 7, furthermore comprising user and/or session delimiting means for delimiting logged visits to a single user person and/or a single user session for ranking said spare visit history.

9. A system as claimed in claim 7, furthermore comprising automatic guide means for guiding a user to arrive at a presented node.

* * * * *